United States Patent [19]

Mansfield

[11] 3,929,584

[45] Dec. 30, 1975

[54] AUTOMATIC CARBON DIOXIDE INCUBATOR

[75] Inventor: Ernest Bryant Mansfield, Pittsburgh, Pa.

[73] Assignee: Fisher Scientific Company, Pittsburgh, Pa.

[22] Filed: Jan. 23, 1975

[21] Appl. No.: 543,360

[52] U.S. Cl. .................... 195/127; 195/142; 73/27 R

[51] Int. Cl.[2] .................... C12B 1/00

[58] Field of Search .............. 195/127, 142; 73/27 R

[56] References Cited

UNITED STATES PATENTS

| | | | |
|---|---|---|---|
| 3,720,093 | 3/1973 | Gill | 73/27 R |
| 3,857,757 | 12/1974 | Herrick et al. | 195/142 |

*Primary Examiner*—Alvin E. Tanenholtz
*Attorney, Agent, or Firm*—Webb, Burden, Robinson and Webb

[57] ABSTRACT

A measurement and control system for automatically and continuously maintaining a predetermined concentration of $CO_2$ in an incubator which monitors the difference between a mixture of air, water and $CO_2$ in the incubator and the air and water vapor supplied to the incubator, derives an electrical signal proportional to the $CO_2$ concentration in the incubator and compares such signal with a signal representing the preset desired concentration to obtain a control signal which regulates the amount of $CO_2$ supplied to the incubator.

7 Claims, 2 Drawing Figures

AUTOMATIC CARBON DIOXIDE INCUBATOR

This invention relates to an environmental chamber and particularly to a $CO_2$ incubator and system for automatically measuring and controlling the $CO_2$ in such an incubator to maintain an optimum environment for bacterial growth and tissue culture studies.

BACKGROUND OF THE INVENTION

Incubators, or more broadly controlled environmental chambers, are an essential tool in biological research, for example, in cancer research, plant growth, venereal disease work, tissue culture growth and bacteriological studies. Such studies require that the incubator environment contain at least 90% relative humidity. To maintain such an environment, various forms of closed environmental chambers or incubators and controls therefor have been developed.

One form of environmental chamber comprises an insulated compartment having a plurality of shelves for holding the specimens. A water tray is disposed in the lower portion of the compartment to provide the required humidity and humidity control depended entirely upon the provision of water in the tray.

Heretofore, incubator environments have been controlled by a thermal conductivity detector device which electrically measures the apparent $CO_2$ concentration in the chamber and compares it to a reference fluid. This type of system requires a separate reference fluid, measures $CO_2$ concentration without regard to actual moisture content in the incubator, and, therefore, does not accurately reflect the actual $CO_2$ concentration of the incubator.

A more recent development in $CO_2$ concentration control in a incubator is disclosed in U.S. Pat. No. 3,756,069 wherein a sample gas and a reference gas is bubbled through a common reservoir to saturate the gases at the same temperature and pressure. The amount of moisture in the reference and the sample is approximately the same. However, the amount of moisture or humidity of the measured gas sample is not the same as in the incubator since the sample is not at the temperature of the incubator. Thus, the measurement of $CO_2$ is inaccurate and the control is not completely satisfactory for research work.

As an incubator is operated at temperatures through a range of 30° – 60°C, water vapor concentration must vary substantially to maintain a constant relative humidity of at least 90%. However, these prior art systems have failed to compensate for the effect of water vapor on the measurement of $CO_2$ in the incubator.

SUMMARY OF THE PRESENT INVENTION

The present invention is an environmental chamber and a system for automatically and continuously controlling the carbon dioxide in the chamber, such as an incubator, comprising means for introducing $CO_2$ to the incubator; means for bubbling air through water and introducing the air and water vapor mixture to the incubator; means for directly comparing the air and water vapor mixture with the air, water vapor and $CO_2$ mixture of the incubator to determine the concentration of $CO_2$ in the incubator; and means responsive to the comparison means for automatically and continuously regulating the amount of $CO_2$ introduced to the incubator.

The system, using thermal conductivity detection principles, automatically and continuously compensates for variations in water vapor concentration caused by a change in the temperature of the environment being measured.

DESCRIPTION OF THE DRAWINGS

A presently preferred embodiment of the invention is illustrated in the drawings wherein.

DETAILED DESCRIPTION OF THE INVENTION

Figure 1:
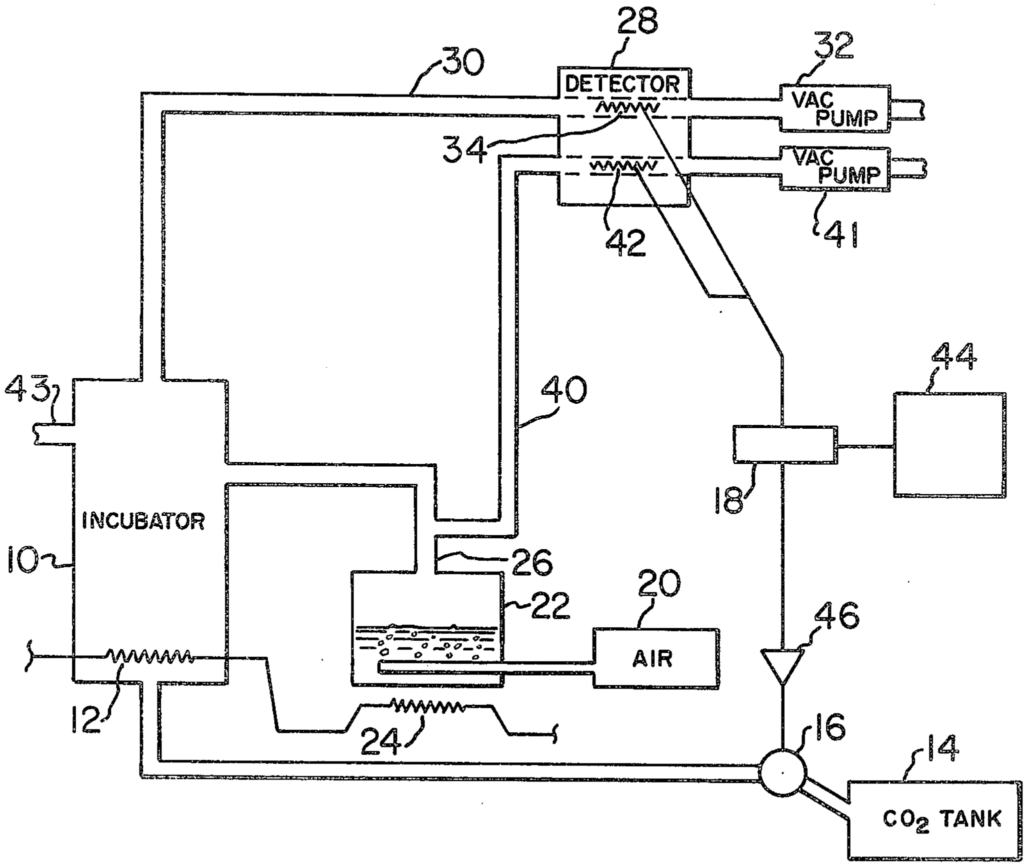
FIG. 1 is a schematic view of the complete control system.

A conventional incubator 10 having a heater 12 forms a controlled environmental chamber useful for laboratory and research work. Carbon dioxide is supplied from a tank 14 to the incubator 10 in an appropriate concentration through a valve means, such as solenoid valve 16, which is responsive to a control signal from a comparator 18. Air at room temperature is supplied from pump or tank 20 to a chamber 22 where it is bubbled through water at a temperature maintained by heater 24 and the air and water mixture is introduced to the incubator through a conduit 26. The heater 12 of the incubator is slaved to the heater 24 of the chamber 22 which runs about 10°C hotter than heater 12 to insure complete saturation in the chamber 22. Thus, the relative humidity can be maintained substantially constant as the temperature of the incubator is varied.

Figure 2:
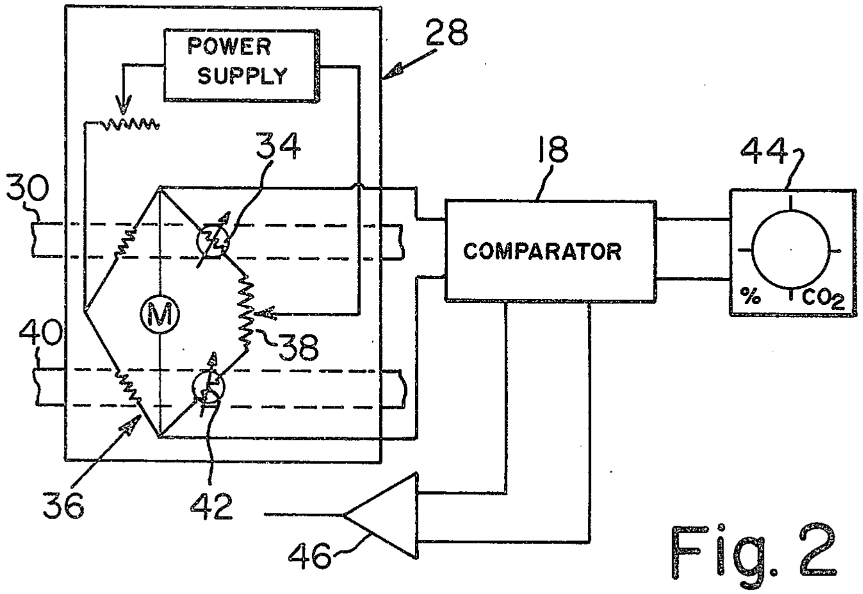
FIG. 2 is a detailed schematic view of the electrical circuit which forms a part of the invention.

The concentration of $CO_2$ in the incubator is maintained at a substantially constant level by an automatic control system which directly and continuously measures the instantaneous concentration of $CO_2$ in the incubator and regulates the $CO_2$ introduced to the incubator in response to that measurement. The system comprises a thermal conductivity detector 28, which may have a heated insulating jacket, having two gas sample input conduits. A conduit 30 is connected between the incubator 10 and the detector 28 and a vacuum pump 32 is provided to draw a gas sample of air, water vapor and $CO_2$, from the incubator through the detector. The thermal conductivity of the sample is sensed by thermistor 34 which forms a part of a standard Wheatstone bridge circuit 36 (FIG. 2). The bridge has a conventional potentiometer 38 for balancing the bridge. A conduit 40 connected into conduit 26 and second vacuum pump 41 is provided to draw a gas sample of air and water vapor from the chamber 22 through the detector 28 where its thermal conductivity is sensed by thermistor 42 of the bridge. If desired, the gas sample drawn through the detector 28 may be recycled from the pumps to an inlet 43 of the incubator.

Since the thermal conductivity of a gas is directly proportional to its concentration, the electrical resistance of the thermistors 34 and 42 will indicate the respective concentrations of the gas samples. When the two mixtures are compared, the difference in electrical signals indicates the concentration of $CO_2$. The signal representing the concentration of $CO_2$ is thereafter fed to the comparator 18 where it is compared with a preset signal from a preset device 44 which is connected to the comparator. The preset device permits an operator to select the appropriate $CO_2$ range within ±1% for the particular research work being conducted. By continuously comparing the electrical signal derived from the thermistors 34 and 42 with the signal from the preset device, a control signal is obtained which is amplified by amplifier 46 and fed to the solenoid valve 16 which regulates the amount of $CO_2$ to be supplied from tank 14 to the incubator 10. Thus, the correct amount of $CO_2$ may be supplied to the incubator 10 to maintain the $CO_2$ concentration in the incubator substantially constant and thus automatically and continuously maintain the environment of the incubator appropriate for the research work being performed.

Having described a preferred embodiment of the invention, it is to be understood that it may otherwise be embodied within the scope of the appended claims.

I claim:

1. A control system for automatically and continuously maintaining a predetermined concentration of $CO_2$ in an incubator comprising:

A. means for supplying $CO_2$ to the incubator;

B. means for supplying water vapor and air to the incubator;

C. means for sampling the gaseous mixture in the incubator;

D. means for sampling the water vapor and air mixture supplied to the incubator;

E. means for deriving electrical signals from the gas mixtures proportional to their respective thermal conductivities to obtain a difference signal;

F. means for comparing the difference signal with a preset signal proportional to the concentration of $CO_2$ desired in the incubator to obtain a control signal; and G. means for regulating the supply of $CO_2$ to the incubator responsive to the control signal to maintain the concentration of $CO_2$ in the incubator substantially constant.

2. A control system as set forth in claim 1 wherein the means for deriving electrical signals from the samples comprises a detector having a pair of gas passageways, each passageway having a thermally responsive electrical element forming a part of a Wheatstone bridge associated therewith such that an electrical signal can be derived which is proportional to the thermal conductivity of the gases in the passageway and the difference between the two signals can be obtained for comparison with a preset signal.

3. A control system as set forth in claim 1 wherein the regulating means comprises a solenoid valve.

4. A control system as set forth in claim 3 wherein the control signal is amplified before being fed to the solenoid valve.

5. A control system as set forth in claim 1 and having a separate chamber for containing water through which air is bubbled for supplying air to controlled relative humidity to the incubator.

6. A control system as set forth in claim 5 wherein the chamber has a heater which is slaved to the heater of the incubator to provide substantially constant relative humidity to the incubator with varying temperature.

7. A carbon dioxide control system for an incubator comprising:

A. a $CO_2$ supply tank connected to the incubator;

B. an air supply;

C. a humidity chamber having an inlet connected to the air supply for bubbling air through water in the chamber and an outlet connected to the incubator;

D. a detector connected to the incubator and to the humidity chamber outlet for continuously measuring the thermal conductivity of a gaseous sample of air, water vapor and $CO_2$ from the incubator and a gaseous sample of air and water from the humidity chamber and for converting the same to an electrical signal proportional to the concentration of $CO_2$ in the incubator;

E. a vacuum pump means connected to said detector for drawing the gaseous samples through the detector;

F. a comparator electrically connected to the detector for comparing the electrical signals from the detector with a preset signal representing a predetermined percentage of $CO_2$ to produce a control signal; and G. a solenoid valve for the $CO_2$ supply tank responsive to the control signal for regulating the amount of $CO_2$ supplied to the incubator to maintain the $CO_2$ concentration in the incubator substantially constant.

* * * * *

UNITED STATES PATENT OFFICE

CERTIFICATE OF CORRECTION

PATENT NO. : 3,929,584

DATED : December 30, 1975

INVENTOR(S) : Ernest Bryant Mansfield

It is certified that error appears in the above-identified patent and that said Letters Patent are hereby corrected as shown below:

Column 1 Line 41 "sample" should read --sampled--.

Claim 5 - Column 4 Line 8 "to" should read --of--.

Signed and Sealed this

*sixteenth* Day of *March 1976*

[SEAL]

*Attest:*

RUTH C. MASON
*Attesting Officer*

C. MARSHALL DANN
*Commissioner of Patents and Trademarks*